(12) United States Patent
Ushiki et al.

(10) Patent No.: US 6,549,775 B2
(45) Date of Patent: Apr. 15, 2003

(54) MOBILE COMMUNICATION SYSTEM

(75) Inventors: Kazumasa Ushiki, Kawasaki (JP);
Mitsunori Fukazawa, Kawasaki (JP);
Takamitsu Toyoda, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/247,353

(22) Filed: Feb. 10, 1999

(65) Prior Publication Data

US 2001/0049282 A1 Dec. 6, 2001

(30) Foreign Application Priority Data

May 8, 1998 (JP) .......................................... 10-126488

(51) Int. Cl.$^7$ ................................................ H04Q 7/20
(52) U.S. Cl. ........................ 455/432; 455/435; 455/456
(58) Field of Search ................................. 455/432, 433, 455/434, 435, 445, 458, 465, 436

(56) References Cited

U.S. PATENT DOCUMENTS

| | | | | |
|---|---|---|---|---|
| 5,153,902 A | * | 10/1992 | Buhl et al. | 379/57 |
| 5,369,681 A | * | 11/1994 | Boudreau et al. | 379/87 |
| 5,369,684 A | * | 11/1994 | Buhl et al. | 379/59 |
| 5,482,131 A | * | 1/1996 | Cortes Guasch et al. | 455/456 |
| 5,987,322 A | * | 11/1999 | Gupta et al. | 455/432 |
| 6,185,421 B1 | * | 2/2001 | Alperovich et al. | 455/433 |

FOREIGN PATENT DOCUMENTS

| | | |
|---|---|---|
| JP | 2-56127 | 2/1990 |
| JP | 4-123533 | 4/1992 |
| JP | 6-29912 | 2/1994 |

* cited by examiner

Primary Examiner—Edward F. Urban
Assistant Examiner—Naghmeh Mehrpour
(74) Attorney, Agent, or Firm—Katten Muchin Zavis Rosenman

(57) ABSTRACT

A mobile communication system employs narrow paging areas for calling mobile stations without increasing location registration requests to a location management center. This system reduces useless calls and improves the efficiency of use of radio resources. Each local area (1-3) of the system is divided into narrow paging areas (1-4). A storage unit (2-1) is installed in each base station (1-5) or exchange station (1-2), to register mobile stations (1-6). When a base station receives a location registration request from a mobile station, the base station registers the mobile station in the storage unit, and if necessary, transmits a location registration request to the location management center. Upon receiving an incoming call to a mobile station, the exchange station sends an inquiry about the mobile station to the storage units, receives an answer from the storage units, finds a paging area where the mobile station is present from the answer, and issues a call request to base stations that belong to the found paging area.

12 Claims, 15 Drawing Sheets

MOBILE COMMUNICATION SYSTEM

BACKGROUND OF THE INVENTION

1. Field of the Invention

The present invention relates to a mobile communication system and, particularly, to a mobile communication system for automobile phones, cellular phones, or PHSs (personal handy phones), capable of registering, deleting the registration of, and calling the phones, i.e., mobile stations in narrow paging areas controlled by the system.

2. Description of the Related Art

FIG. 15 shows a mobile communication system according to a prior art. The system includes a location management center 15-1, exchange stations 15-2, location areas 15-3, base stations 15-4, and mobile stations. Location area identifiers LAI1 and LAI2 are assigned to the location areas 15-3, respectively.

To identify the location of a mobile station 15-5 in the system, the service area of the system is divided into the location areas 15-3. Each location area 15-3 contains the base stations 15-4 each of which periodically transmits a radio signal containing a location area identifier such as LAI1 and LAI2 assigned to the location area to which the base station belongs.

The mobile station 15-5 receives the radio signal and stores the location area identifier therein. When moving from the location area LAI1 to the location area LAI2, the mobile station 15-5 detects that the location area identifier LAI1 presently held therein differs from the newly received location area identifier LAI2, and transmits a location registration request to the base station 15-4.

In response to the location registration request, the base station 15-4 sends a location registration request to the center 15-1 through the exchange station 15-2. The center 15-1 registers the location area identifier LAI2 for the mobile station 15-5.

If an incoming call to the mobile station 15-5 occurs, the exchange station 15-2 inquires of the center 15-1 a location area where the mobile station 15-5 is present, acquires the location area, and transmits a paging request to all base stations 15-4 belonging to the acquired location area. In response to the paging request, these base stations 15-4 simultaneously page the mobile station 15-5 in the respective radio zones.

In this way, the mobile station 15-5 transmits a location registration request whenever it moves from one location area to another. If an incoming call to the mobile station 15-5 occurs, all base stations 15-4 in the location area where the mobile station 15-5 is present simultaneously page the mobile station 15-5. If each location area 15-3 is large, many base stations 15-4 therein must simultaneously page a mobile station whenever an incoming call arises to the mobile station. Namely, many base stations 15-4 whose radio zones do not involve the mobile station must make useless paging to deteriorate the effective use of radio resources.

If each location area 15-3 is small, the mobile stations must frequently issue a location registration request when moving from one location area to another. This congests network traffic and puts heavy load on the center 15-1.

SUMMARY OF THE INVENTION

An object of the present invention is to provide a mobile communication system capable of reducing the size of paging areas to reduce useless paging and improve the effective use of radio resources without increasing location registration requests to a location management center.

In order to accomplish the object, the present invention provides (1) a mobile communication system having a location management center, an exchange station, base stations, and mobile stations. The location management center registers the mobile stations in connection with location areas where the mobile stations are present. The exchange station processes calls to and from the mobile stations according to the location areas registered in the location management center and in cooperation with the base stations that control radio channels to the mobile stations. The mobile stations transmit and receive radio signals to and from the base stations through the radio channels. The location areas are each divided into paging areas. Each of the base stations or the exchange station has a storage unit for registering each mobile station in connection with one of the paging areas where the mobile station is present. The base stations have each a unit for receiving a location registration request from a mobile station and registering the mobile station in connection with a corresponding paging area in the storage unit, and a unit for determining according to the location registration request whether or not the location area registered for the mobile station must be updated, and if it must be updated, transmitting a location registration request to the location management center through the exchange station. The exchange station has a unit for receiving an incoming call to a mobile station, referring to the location management center to find the location area registered for the mobile station, transmitting an inquiry about the mobile station to the storage units according to the found location area, receiving an answer to the inquiry, and identifying one of the paging areas where the mobile station is present according to the answer, and a unit for transmitting a paging request to the base stations that belong to the identified paging area.

(2) The base stations have each a radio channel controller for controlling radio channels to the mobile stations, a wire channel controller for controlling wire channels in cooperation with the exchange station, and a storage unit for storing a mobile station identifier contained in a location registration request received from one of the mobile stations.

(3) The base stations have each a unit for transmitting a radio signal to the mobile stations, the radio signal containing a location area identifier representing one of the location areas to which the base station belongs, a paging area identifier representing one of the paging areas to which the base station belongs, and a base station identifier representing the base station.

(4) The mobile stations have each a radio controller for controlling radio channels in cooperation with the base stations and a memory for storing a location area identifier, a paging area identifier, and a base station identifier transmitted from one of the base stations.

(5) The mobile stations have each a unit for comparing a location area identifier and a paging area identifier stored therein with a location area identifier and a paging area identifier transmitted from one of the base stations, and if a difference is detected in at least one of them, transmitting to the base station a location registration request containing a mobile station identifier of its own.

(6) The location registration request further contains the location area identifier and paging area identifier stored in the memory of the mobile station. The base stations have each a unit for determining whether or not the location area identifier contained in the location registration request is equal to that of a location area to which the base station belongs, and if they are not equal to each other, transmitting a location registration request to the location management center through the exchange station.

(7) A location registration request to be transmitted from any one of the mobile stations contains a base station identifier stored in the memory of the mobile station. The base stations have each a unit for receiving a location registration request from one of the mobile stations and transmitting a deletion request to a base station whose identifier is contained in the location registration request so that the latter base station may delete therefrom a mobile station identifier representing the mobile station that has issued the location registration request.

(8) The exchange station has a unit for receiving an incoming call to one of the mobile stations, sending an inquiry about the mobile station to the storage units, receiving answers to the inquiry, and if the answers indicate a plurality of the paging areas, transmitting a paging request to the base stations that belong to the plurality of the paging areas and transmitting a deletion request to delete a mobile station identifier representing the mobile station in question to the storage units that manage the paging areas that have returned no acknowledgment to the paging request.

(9) The storage unit installed in each of the base stations or the exchange station has a unit for deleting a mobile station identifier if a mobile station represented with the mobile station identifier causes no outgoing call, incoming call, or location registration request within a predetermined period.

(10) The location management center has a unit for receiving a location registration request originated from one of the mobile stations that has just moved from one of the location areas to another and transmitting a deletion request to delete a mobile station identifier representing the mobile station in question to the storage units related to the paging areas that are in the location area from which the mobile station in question has just moved out.

BRIEF DESCRIPTION OF THE DRAWINGS

The present invention will be more clearly understood from the description as set forth below with reference to the accompanying drawings, in which.

DESCRIPTION OF THE PREFERRED EMBODIMENTS

Figure 1:
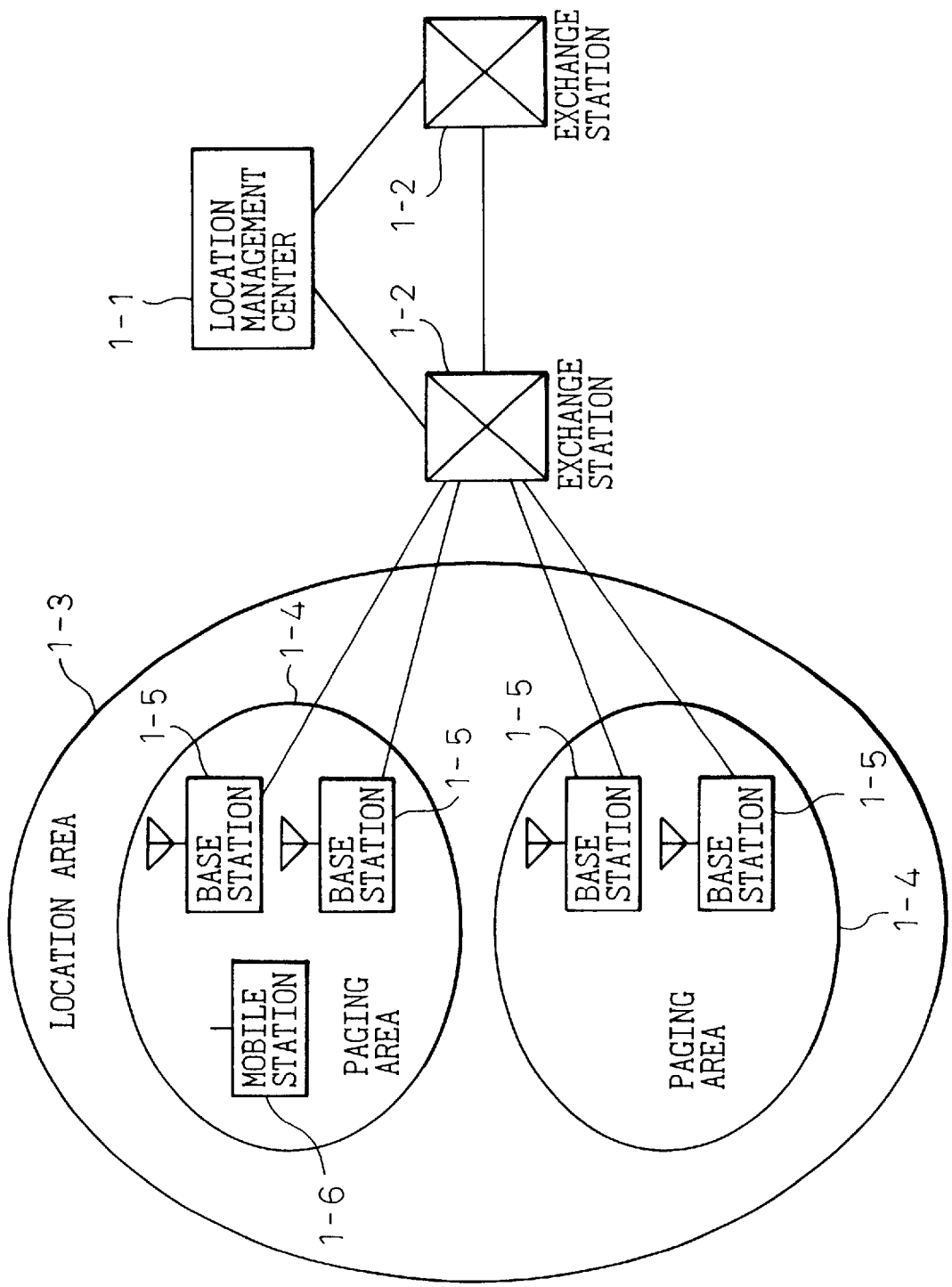
FIG. 1 shows a mobile communication system according to an embodiment of the present invention.

FIG. 1 shows a mobile communication system according to an embodiment of the present invention. The system includes a location management center 1-1, exchange stations 1-2, location areas 1-3, paging areas 1-4, base stations 1-5, and mobile stations (only one is shown with a reference numeral of 1-6).

The present invention divides each location area 1-3 into paging areas 1-4 each serving as a unit to page. Unlike the prior art that uses the location area 1-3 as a unit to page, the present invention employs the smaller paging area 1-4 as a paging unit, to reduce the number of useless paging and improve the efficiency of use of radio resources.

Whenever moving from one of the paging areas 1-4 to another, the mobile station 1-6 updates a paging area to which the mobile station belongs. At this time, the exchange station 1-2 does not notify the center 1-1 of the updating of a paging area. Only when the mobile station 1-6 moves from one location area to another, the exchange station 1-2 sends a location registration request to the center 1-1. As a result, load on the center 1-1 to handle location registration requests is substantially the same as that of the prior art. Namely, the present invention never increases load on the center 1-1.

Figure 2:
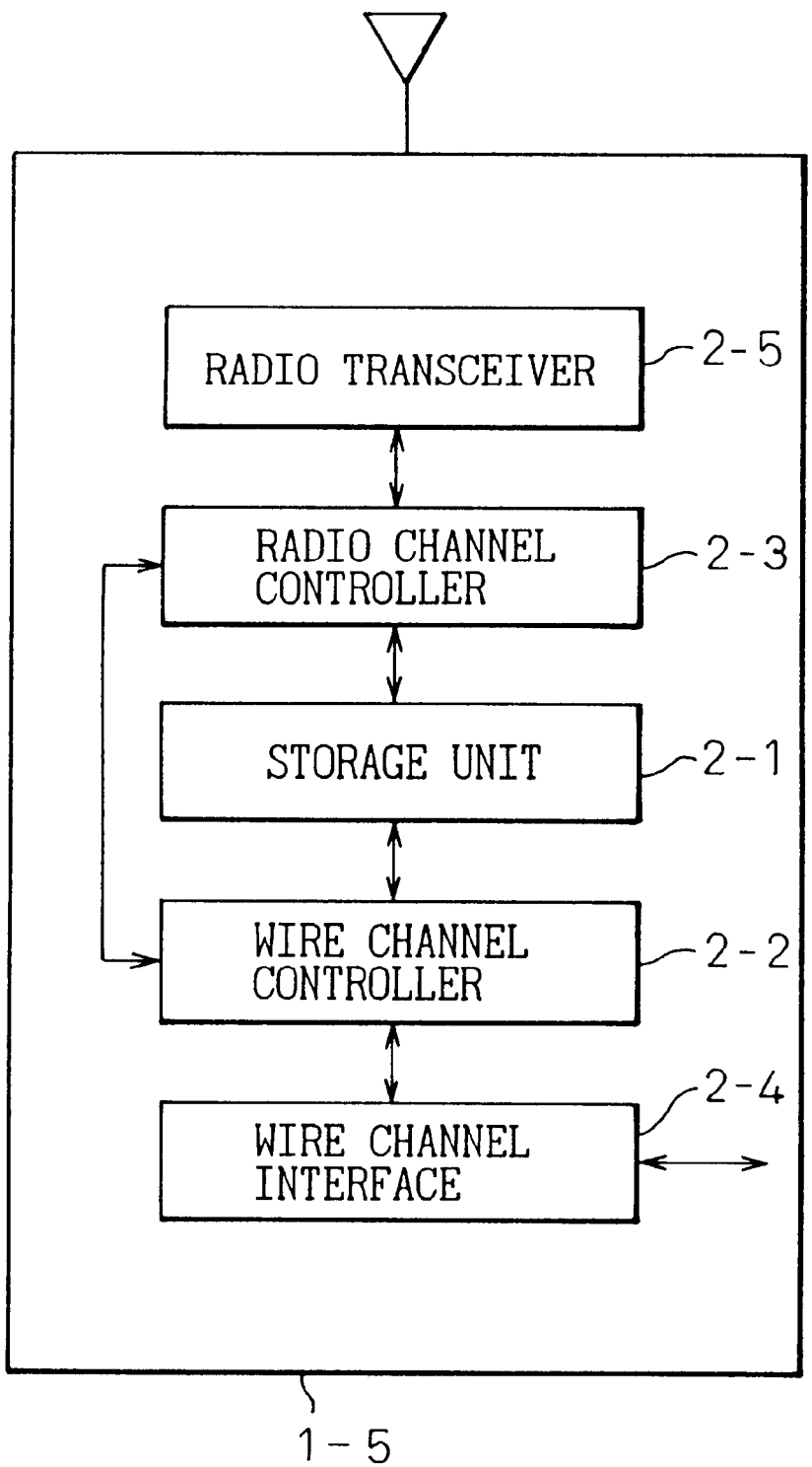
FIG. 2 shows a base station in the system of FIG. 1.

FIG. 2 shows the structure of one of the base stations 1-5. The base station 1-5 has a storage unit 21 for storing data about mobile stations, a wire channel controller 2-2, a radio channel controller 2-3, a wire channel interface 2-4, and a radio channel transceiver 25.

The storage unit 2-1 stores mobile station identifiers representing mobile stations that are present in a paging area to which the base station 1-5 belongs. The wire channel controller 2-2 receives an inquiry about the contents of the storage unit 2-1 from the exchange station 1-2, returns an answer to the inquiry, receives a paging request from the exchange station 1-2, and sends a paging request and a location registration request due to a change in the location area of a mobile station to the exchange station 1-2.

The radio channel controller 2-3 sends a location area identifier, paging area identifier, and base station identifier to all mobile stations that are in the radio zone of the base station 1-5. The radio channel controller 2-3 receives a location registration request from a mobile station that has moved from outside to the paging area to which the base station 1-5 belongs, and sets radio channels to the mobile station. The radio transceiver 2-5 is controlled by the radio channel controller 2-3, to transmit and receive signals to and from mobile stations through information and control channels.

Figure 3:
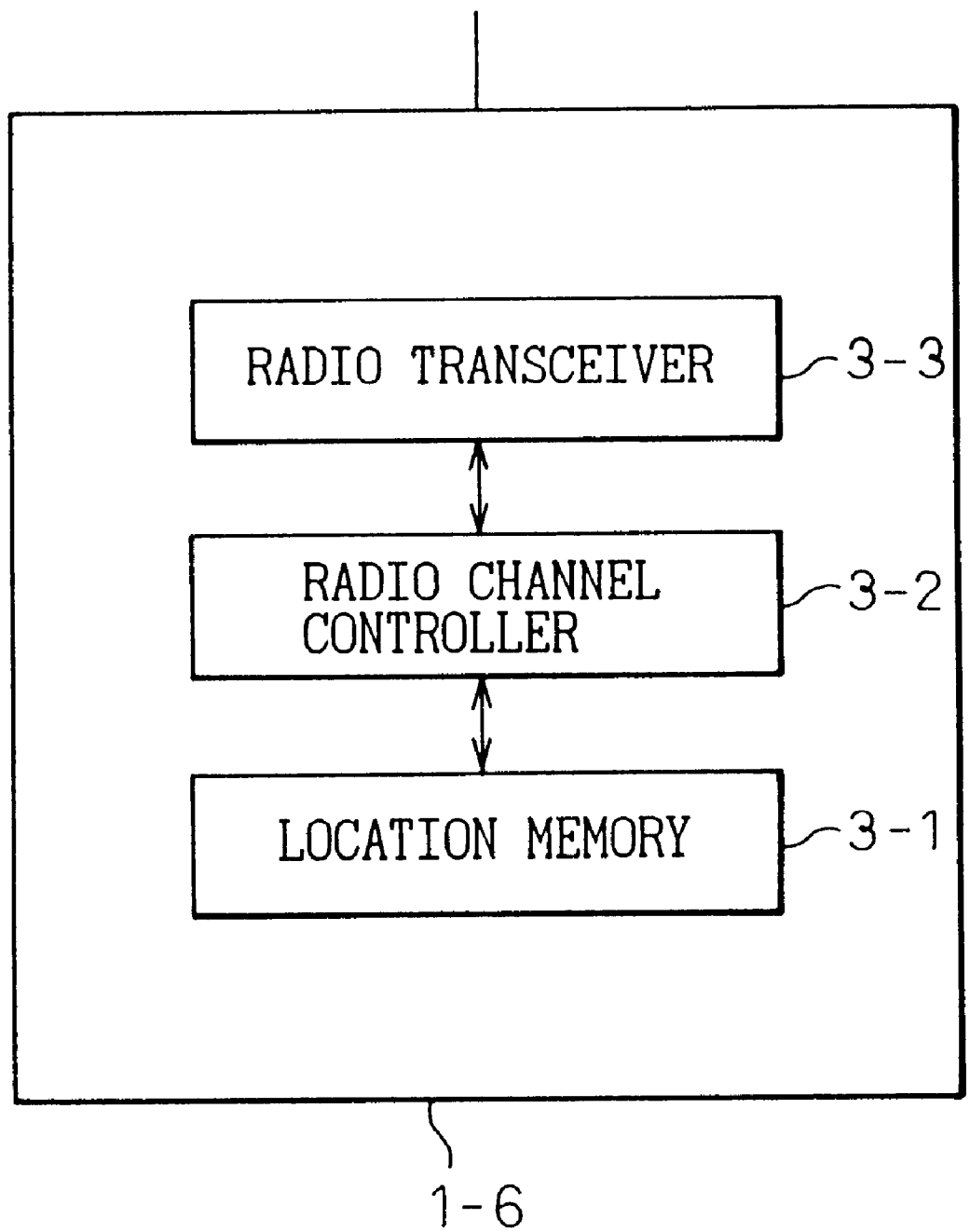
FIG. 3 shows a mobile station in the system of FIG. 1.

FIG. 3 shows the structure of the mobile station 1-6. The mobile station has a location memory 3-1, a radio channel controller 3-2, and a radio transceiver 33. The memory 3-1 stores a location area identifier, a paging area identifier, and a base station identifier transmitted from a corresponding base station.

When the mobile station 1-6 moves, it may receive from one of the base stations 1-5 a location area identifier or a paging area identifier that is different from that stored in the memory 3-1. In this case, the radio channel controller 3-2 determines that the mobile station 1-6 has moved to a different area and transmits a location registration request. The radio transceiver 3-3 is controlled by the radio channel controller 3-2, to transmit and receive radio signals to and from the base stations 1-5 through information and control channels.

Location registration, paging, and location deletion operations according to the present invention will be explained with reference to FIGS. 4 to 10.

Figure 4:
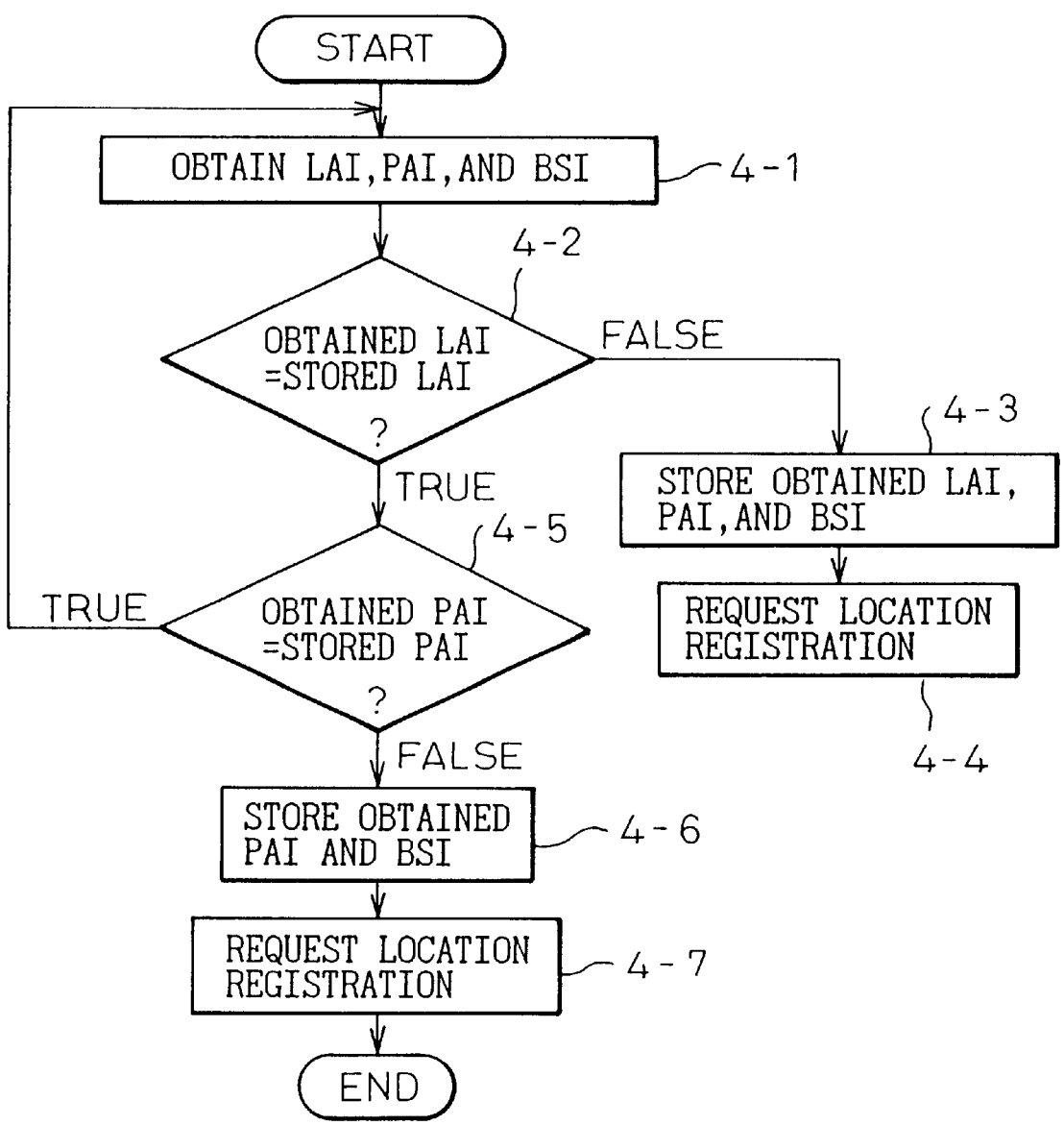
FIG. 4 is a flowchart showing the steps of transmitting a location registration request from the mobile station of FIG. 3.

FIG. 4 is a flowchart showing the steps of transmitting a location registration request from the mobile station 1-6 according to the present invention. In step 4-1, the mobile station 1-6 periodically receives, from one of the base stations 1-5, a location area identifier LAI, a paging area identifier PAI, and a base station identifier BSI.

In step 4-2, the mobile station 1-6 checks to see if the received location area identifier LAI is equal to a location area identifier LAI stored in the memory 3-1.

If they are not equal to each other, it is determined that the mobile station 1-6 has moved from one location area to another. Then, in step 4-3, the mobile station 1-6 stores the received identifiers LAI, PAI, and BSI into the memory 3-1, and in step 4-4, transmits a location registration request to the base station 1-5. Steps to be carried out by the base station 1-5 will be explained later with reference to FIGS. 5 and 6.

If it is determined that the LAIs are equal to each other in step 4-2, the mobile station 1-6 checks, in step 4-5, to see if the received paging area identifier PAI is equal to a paging area identifier stored in the memory 31.

If they are not equal to each other, the mobile station 1-6 stores, in step 4-6, the received identifiers PAI and BSI into the memory 3-1, and in step 4-7, transmits a location registration request to the base station 1-5. If it is determined in step 4-5 that the PAIs are equal to each other, the flow returns to step 41.

In this way, the mobile station 1-6 periodically receives a location area identifier LAI, a paging area identifier PAI, and a base station identifier BSI from one of the base stations 1-5, and if the received LAI or PAI differs from a stored LAI or PAI, stores the LAI, PAI, and BSI and transmits a location registration request.

Figure 5:
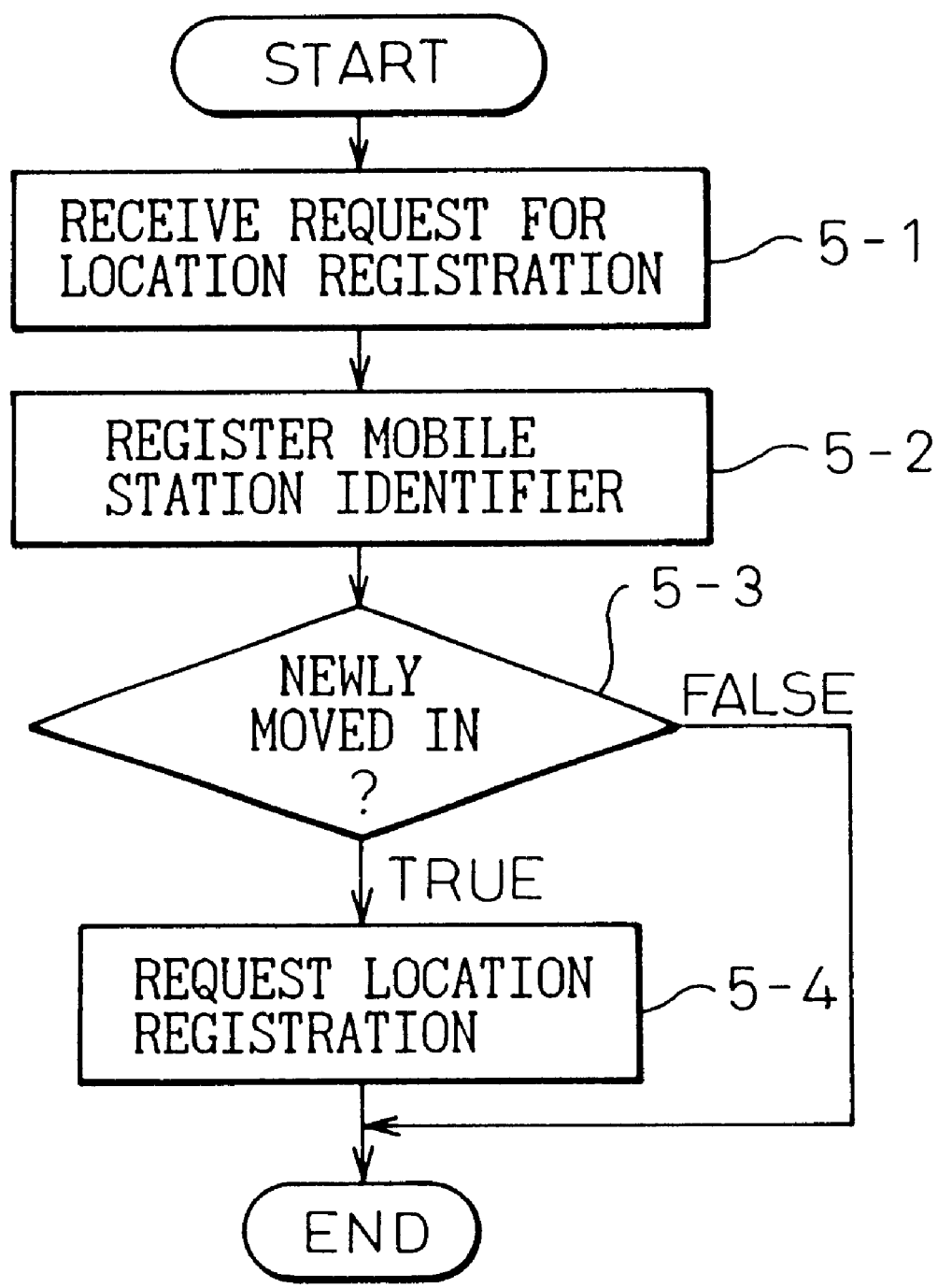
FIG. 5 is a flowchart showing the steps of handling a location registration request in the base station of FIG. 2.

FIG. 5 is a flowchart showing the steps of handling a location registration request in the base station 1-5 of FIG. 2 according to the present invention. In step 5-1, the base station 1-5 receives, from a mobile station, a location registration request with a mobile station identifier and a location area identifier LAI stored in the memory 3-1 of the mobile station.

In step 5-2, the base station 1-5 stores the mobile station identifier into the storage unit 2-1. In step 53, the base station 1-5 checks to see if the received LAI is equal to the LAI of a location area to which the base station 1-5 belongs. Namely, step 5-3 determines whether or not the mobile station has newly moved into the location area to which the base station 1-5 belongs.

If step 5-3 is true, the base station 1-5 transmits in step 5-4 a location registration request to the center 1-1 through the exchange station 1-2 to update the location area registered for the mobile station, and the flow ends. If step 5-3 is false, the base station 1-5 transmits no location registration request, and the flow ends.

If the mobile station 1-6 moves from one location or paging area to another, a corresponding one of the base stations 1-5 receives a location registration request from the mobile station 1-6 and stores a mobile station identifier representing the mobile station 1-6 into the storage unit 2-1. In addition, if the mobile station 1-6 has moved from one location area to another, the base station 1-5 transmits a location registration request to the center 1-1 through the exchange station 1-2.

At this time, the mobile station identifier of the mobile station 1-6 stored in a base station that was controlling the mobile station 1-6 so far is deleted according to a timer process or an incoming call process to be explained later.

Figure 6:
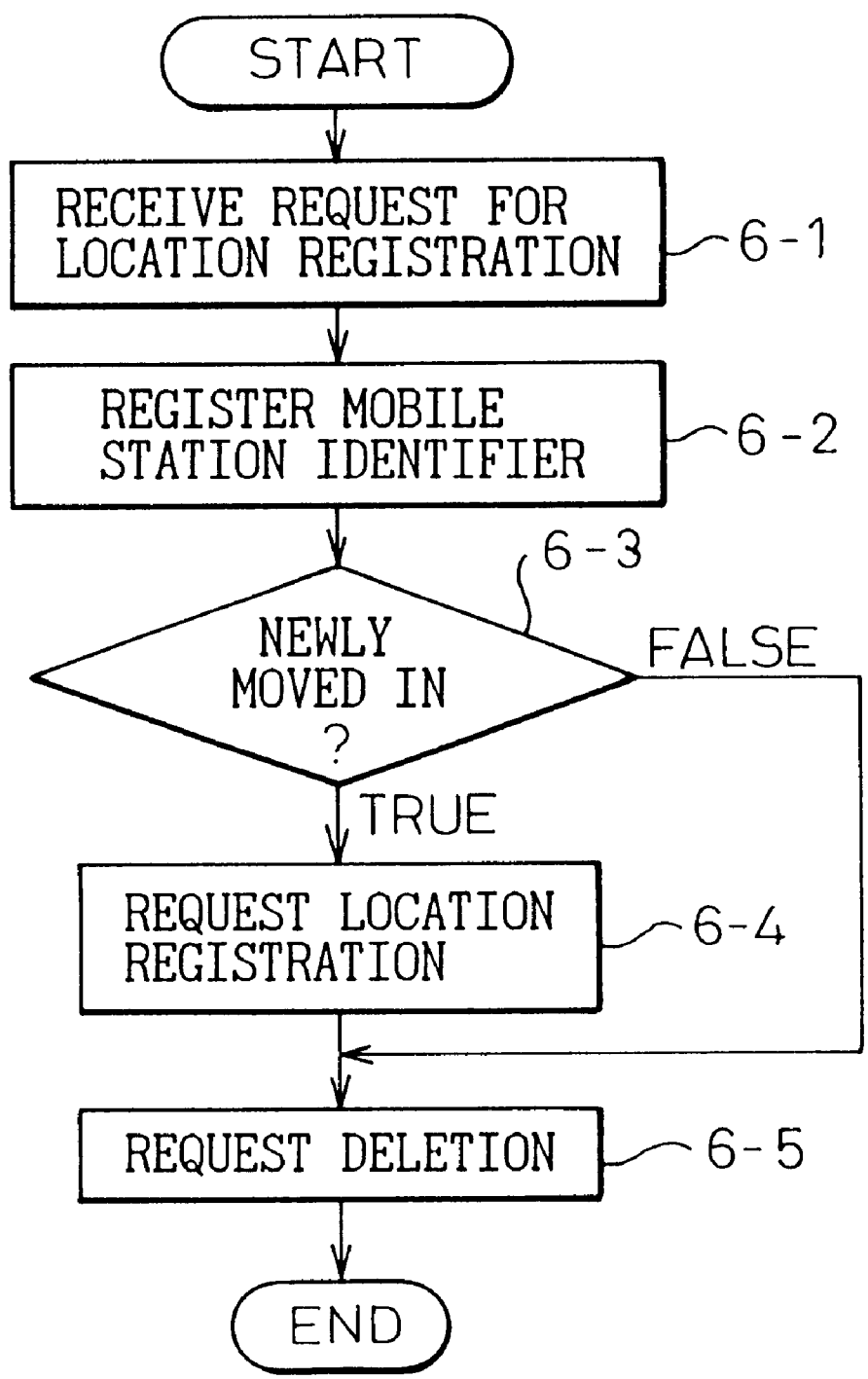
FIG. 6 is a flowchart showing other steps of handling a location registration request in the base station of FIG. 2.

FIG. 6 is a flowchart showing the steps of handling a location registration request in the base station 1-5 of FIG. 2 according to the present invention. This flowchart is based on FIG. 5 and step 6-5 of FIG. 6 is additional to FIG. 5. In step 6-1, the base station 1-5 receives, from a mobile station, a location registration request with a mobile station identifier and a location area identifier LAI stored in the memory 3-1 of the mobile station.

In step 6-2, the base station 1-5 registers the received mobile station identifier into the storage unit 2-1. In step 6-3, the base station 1-5 checks to see if the received location area identifier LAI is equal to a location area identifier LAI representing a location area to which the base station 1-5 belongs. Namely, step 6-3 determines whether or not the mobile station has newly moved into the location area of the base station 1-5.

If step 6-3 is true, the base station 1-5 transmits, in step 6-4, a location registration request to the center 1-1 through the exchange station 1-2 to update the location area registered for the mobile station. If step 6-3 is false, the base station 1-5 transmits no location registration request.

In step 6-5, the base station 1-5 recognizes a base station in which the mobile station in question was registered so far, according to a base station identifier BSI contained in the location registration request received from the mobile station. In step 6-5, the base station 1-5 transmits a deletion request to the previous base station to delete the mobile station identifier representing the mobile station in question.

When any mobile station moves from one location or paging area to another, a corresponding one of the base stations 1-5 receives a location registration request from the mobile station and stores a mobile station identifier representing the mobile station in the storage unit 2-1 of the base station. If a mobile station moves from one location area to another, a corresponding base station receives a location registration request from the mobile station and transmits a location registration request to the center 1-1 through the exchange station 1-2. At the same time, the base station transmits a deletion request to a previous base station in which a mobile station identifier representing the mobile station in question is stored. In response to the deletion request, the previous base station deletes the mobile station identifier.

Figure 7:
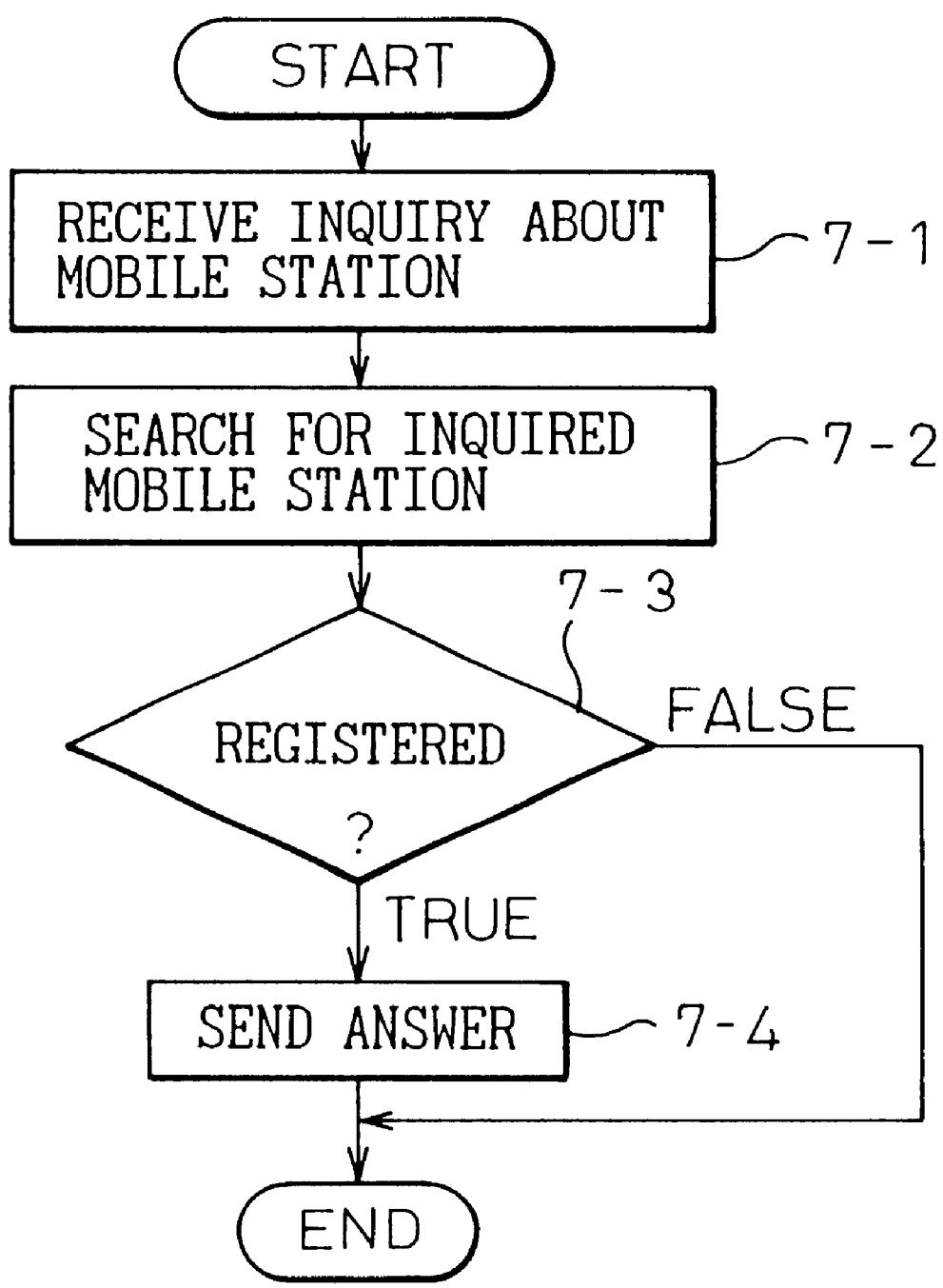
FIG. 7 is a flowchart showing the steps of handling an inquiry about a mobile station in the base station of FIG. 2.

FIG. 7 is a flowchart showing the steps of handling an inquiry about a mobile station in the base station 1-5 of FIG. 2 according to the present invention. In step 7-1, the base station 1-5 receives an inquiry about a mobile station from the exchange station 1-2. In step 7-2, the base station 1-5 searches the storage unit 2-1 for the inquired mobile station. In step 7-3, the base station 1-5 determines whether or not the inquired mobile station is registered in the storage unit 2-1.

If step 7-3 is true, the base station 1-5 transmits, in step 7-4, an answer to the exchange station 1-2 to indicate that the inquired mobile station is registered therein, and the flow ends. If step 7-3 is false, the base station 1-5 transmits no answer, and the flow ends.

Figure 8:
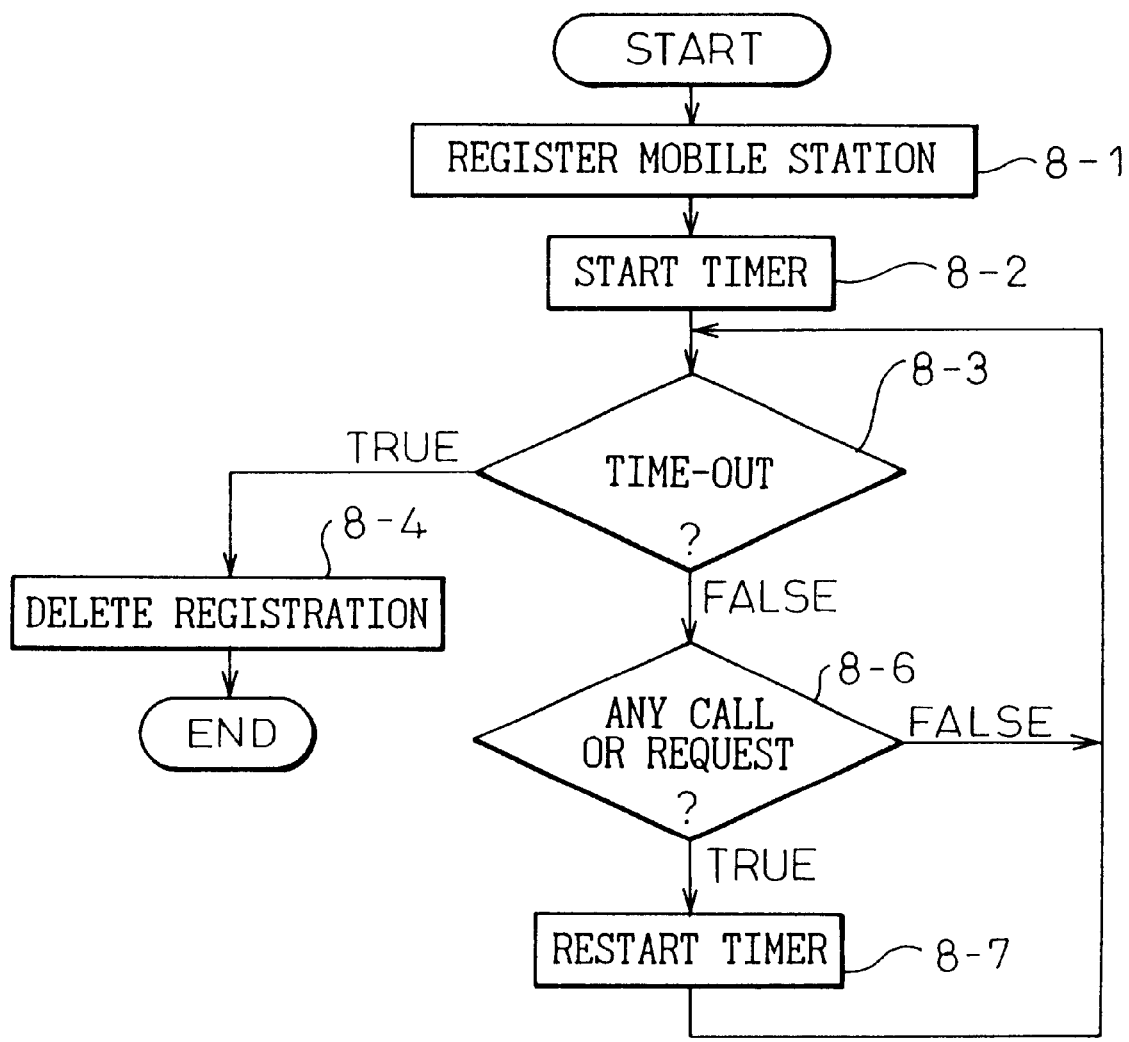
FIG. 8 is a flowchart showing the steps of deleting a mobile station identifier with the use of a timer in the base station of FIG. 2.

FIG. 8 is a flowchart showing the steps of deleting a registered mobile station with the use of a timer in the base station 1-5 of FIG. 2 according to the present invention. In step 8-1, the base station 1-5 newly registers a mobile station identifier in the storage unit 2-1. In step 8-2, the base station 1-5 starts a time for the registered mobile station. In step 8-3, the base station 1-5 checks to see if the timer has counted a set time.

If step 8-3 is true, the base station 1-5 deletes, in step 8-4, the registered mobile station identifier, and the flow ends. If step 8-3 is false, the base station 1-5 checks, in step 8-6, to see if the registered mobile station has caused an outgoing call, incoming call, or location registration request.

If step 8-6 is true, the base station 1-5 restarts, in step 8-7, the timer for the registered mobile station and returns to step 8-3. If step 8-6 is false, the base station 1-5 continues the timer for the registered mobile station and returns to step 8-3.

In this way, the base station 1-5 deletes a mobile station identifier representing a given mobile station from the storage unit 2-1, if the given mobile station causes no outgoing call, incoming call, or location registration request within a set time. If the given mobile station causes an outgoing call, incoming call, or location registration request within the set time, the base station 1-5 keeps the mobile station identifier in the storage unit 2-1.

If a mobile station moves out of the paging area to which the base station 1-5 belongs, the mobile station never causes an outgoing call, incoming call, or location registration request with respect to the base station 1-5. Accordingly, the base station 1-5 deletes a mobile station identifier representing the mobile station in question from the storage unit 2-1. If a mobile station is present in the paging area of the base station 1-5, the mobile station usually causes an outgoing call, incoming call, or location registration request within a certain time. The base station 1-5, therefore, keeps a mobile station identifier representing the mobile station in question in the storage unit 2-1 as long as the base station 1-5 detects such an outgoing call, incoming call, or location registration request related to the mobile station in question.

The mobile stations transmit a location registration request not only when they move from one location or paging area to another but also when they are activated. Accordingly, even if a mobile station identifier is deleted from the storage unit 2-1 of a given base station, it will be registered again when the mobile station is activated. If a mobile station registered in the storage unit 2-1 is turned off and then on within the set time of a timer for the mobile station, the mobile station will not be deleted from the storage unit 2-1 because the timer is restarted when the mobile station is turned on.

Figure 9:
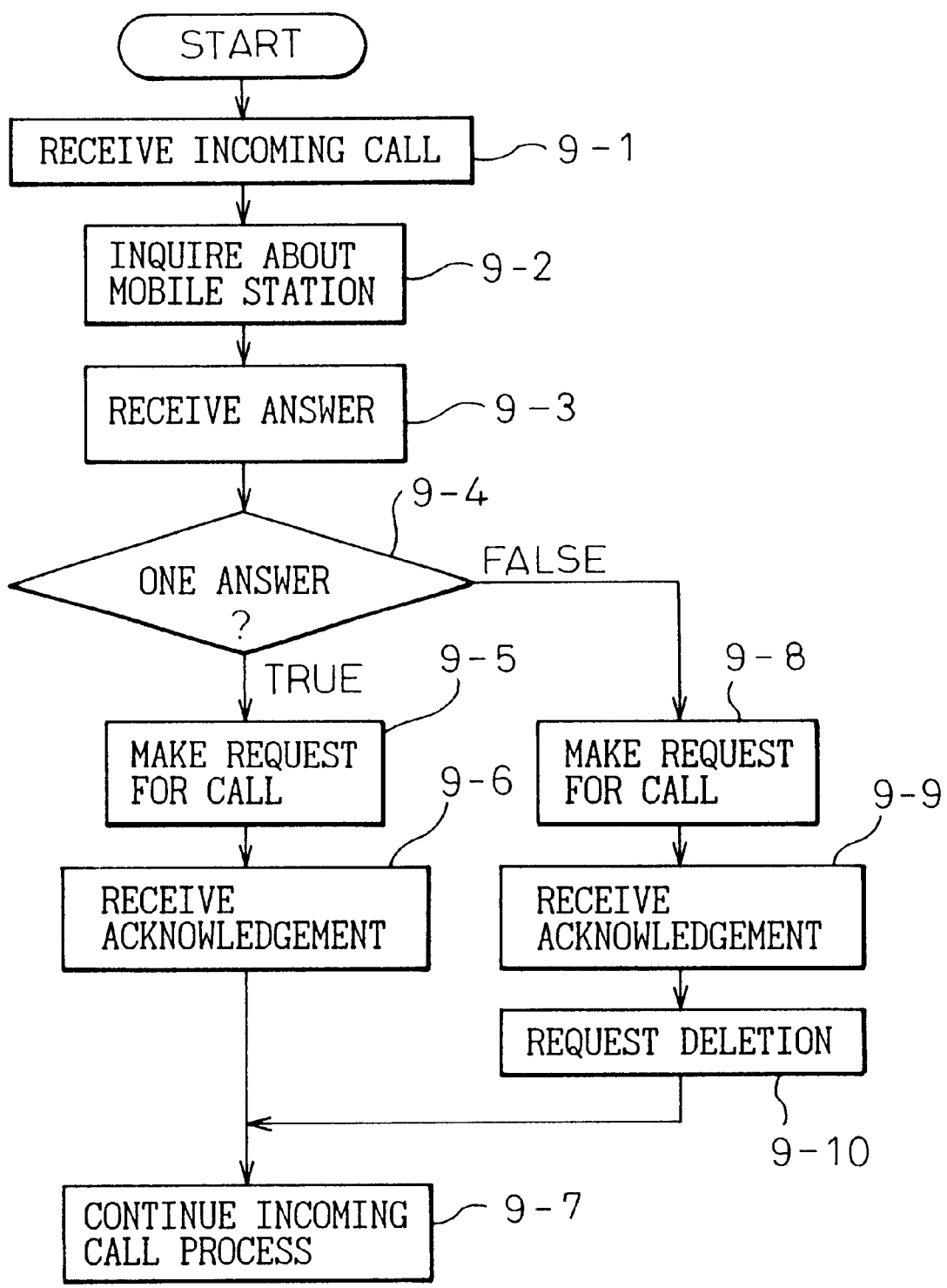
FIG. 9 is a flowchart showing the steps of handling an incoming call in an exchange station of the system of FIG. 1.

FIG. 9 is a flowchart showing the steps of handling an incoming call to a mobile station in the exchange station 1-2 according to the present invention. In step 9-1, the exchange station 1-2 receives an incoming call to a mobile station that is in the location area controlled by the exchange station 1-2. In step 9-2, the exchange station 1-2 sends an inquiry to the base stations 1-5 belonging to the location area to ask whether or not the mobile station in question is registered therein.

In step 9-3, the exchange station 1-2 receives answers from the base stations 1-5. In step 9-4, the exchange station 1-2 checks to see if the number of the answers is single.

Namely, step 9-4 checks to see if the mobile station in question is registered in a single base station. Each base station in which the mobile station in question is registered returns an answer to the exchange station 1-2, and any base station in which the mobile station in question is not registered returns no answer. Accordingly, step 9-4 determines the number of base stations in which the mobile station in question is registered according to the number of answers received.

If there is a single answer in step 9-4, the exchange station 1-2 transmits, in step 9-5, a paging request to all base stations 1-5 that are in a paging area 1-4 to which the base station 1-5 that returned the answer belongs. In step 9-6, the exchange station 1-2 receives an acknowledgment of the reception of the paging request, and in step 9-7, continues to process the call.

If there are plural answers in step 9-4, the exchange station 1-2 transmits, in step 9-8, a paging request to all base stations 1-5 that are in paging areas 1-4 to which the base stations 1-5 that returned the answers belong. In step 9-9, the exchange station 1-2 receives an acknowledgment of the receipt of the paging request and recognizes a paging area 1-4 to which the base station 1-5 that returned the acknowledgment belongs.

In step 9-10, the exchange station 1-2 transmits a deletion request for deleting a mobile station identifier representing the mobile station in question to the base stations 1-5 that are in the paging areas to which the paging request was transmitted and that returned no acknowledgment of the receipt of the paging request.

When a mobile station moves from one location or paging area to another, a base station in which the mobile station was registered before the movement keeps the registration as shown in FIG. 5. The present invention deletes such registration with the use of the timer of FIG. 8 or by the deletion request of FIG. 9.

Figure 10:
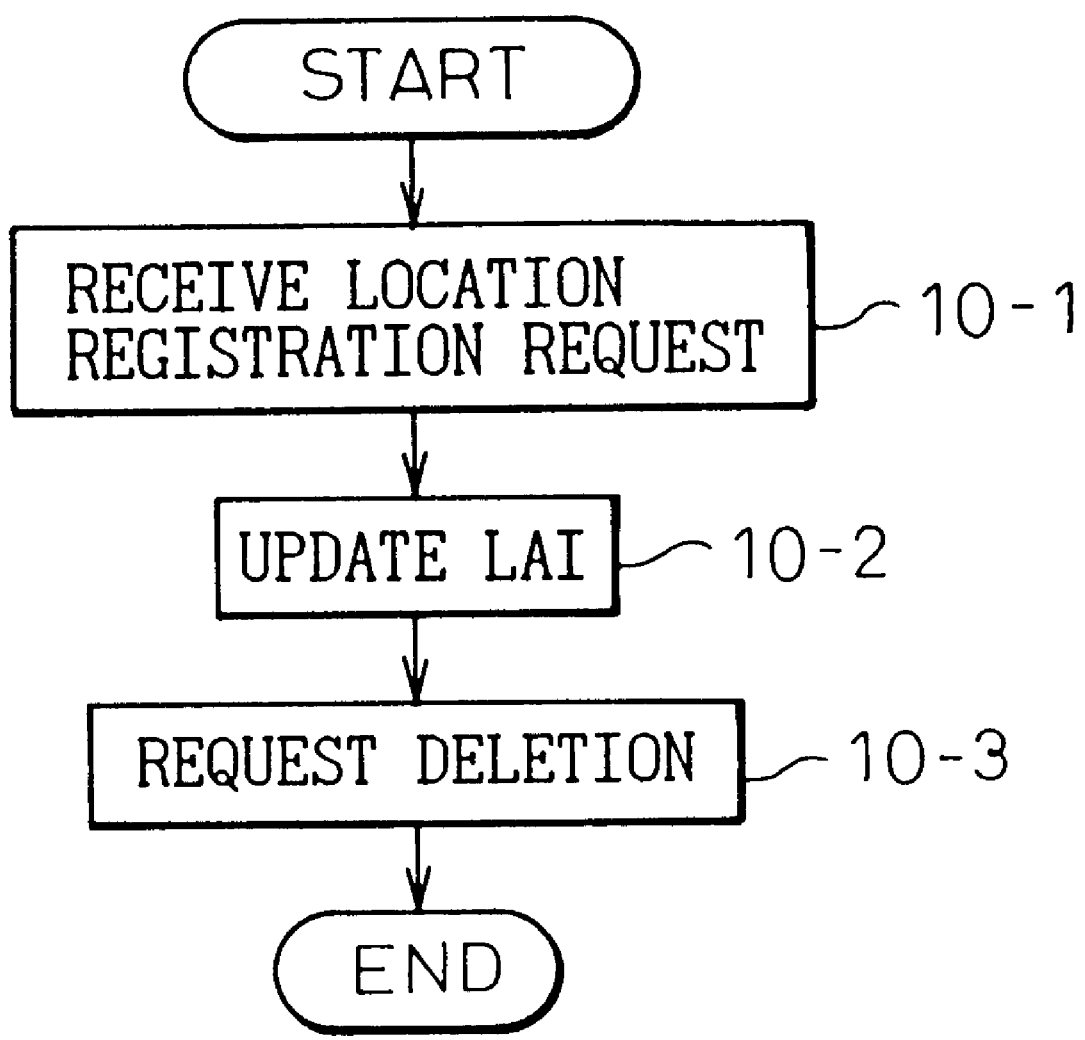
FIG. 10 is a flowchart showing the steps of handling a location registration request in a location management center of the system of FIG. 1.

FIG. 10 is a flowchart showing the steps of handling a location registration request in the location management center 1-1. In step 10-1, the center 1-1 receives a location registration request for a mobile station from one of the exchange stations 1-2. In step 10-2, the center 1-1 updates a registered location area identifier for the mobile station according to a location area identifier contained in the location registration request.

In step 10-3, the center 1-1 transmits, through the exchange station 1-2, a deletion request for deleting a mobile station identifier representing the mobile station in question to a base station that was controlling the mobile station in question so far and in which the mobile station identifier is still registered. Then, the flow ends. In response to the deletion request, the base station deletes the mobile station identifier from the storage unit 2-1 thereof.

Sequences of registering and deleting the location of a mobile station according to the present invention will be explained with reference to FIGS. 11 to 14.

Figure 11:
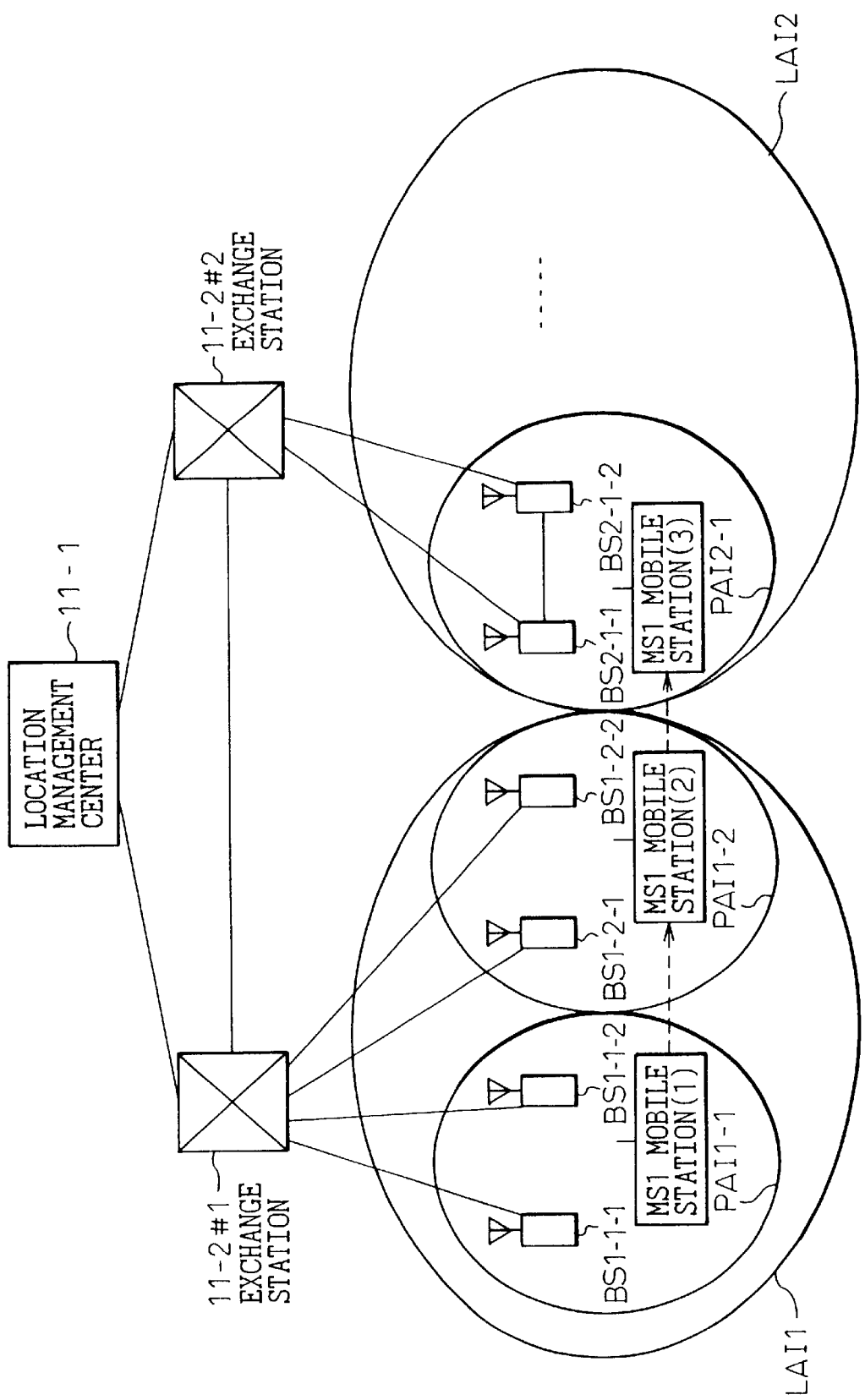
FIG. 11 shows a mobile communication system with a mobile station changing the location thereof according to the present invention.

FIG. 11 shows a mobile communication system in which a mobile station moves from a location to another according to the present invention. The system includes a location management center 11-1, exchange stations 11-2#1 and 11-2#2, location areas LAI1 and LAI2, paging areas PAI1-1 and PAI1-2 formed in the location area LAI1, a paging area PAI2-1 formed in the location area LAI2, base stations BS1-1-1 and BS1-1-2 installed in the paging area PAI1-1, base stations BS1-2-1 and BS1-2-2 installed in the paging area PAI1-2, base stations BS2-1-1 and BS2-1-2 installed in the paging area PAI2-1, and a mobile station MS1.

The mobile station MS1 moves between, for example, locations (1) and (3). The location (1) is in the paging area PAI1-1, the location (2) in the paging area PAI1-2, and the location (3) in the paging area PAI2-1.

The exchange station 11-2#1 controls the location area LAI1 and is connected to the base stations BS1-1-1, BS1-1-2, BS1-2-1, and BS1-2-2. The location area LAI1 is divided into the paging areas PAI1-1 and PAI1-2. The paging area PAI1-1 contains the base stations BS1-1-1 and BS1-1-2, and the paging area PAI1-2 contains the base stations BS1-2-1 and BS1-2-2.

The exchange station 11-2#2 controls the location area LAI2 and is connected to the base stations BS2-1-1 and BS2-1-2. The location area LAI2 is divided into paging areas among which only the paging area PAI2-1 is shown in FIG. 11. The paging area PAI2-1 contains the base stations BS2-1-1 and BS2-1-2.

A sequence of transmitting and receiving signals for location registration, location deletion, and call handling for the mobile station MS1 moving between the locations (1) and (3) will be explained with reference to FIGS. 12 to 14.

Figure 12:
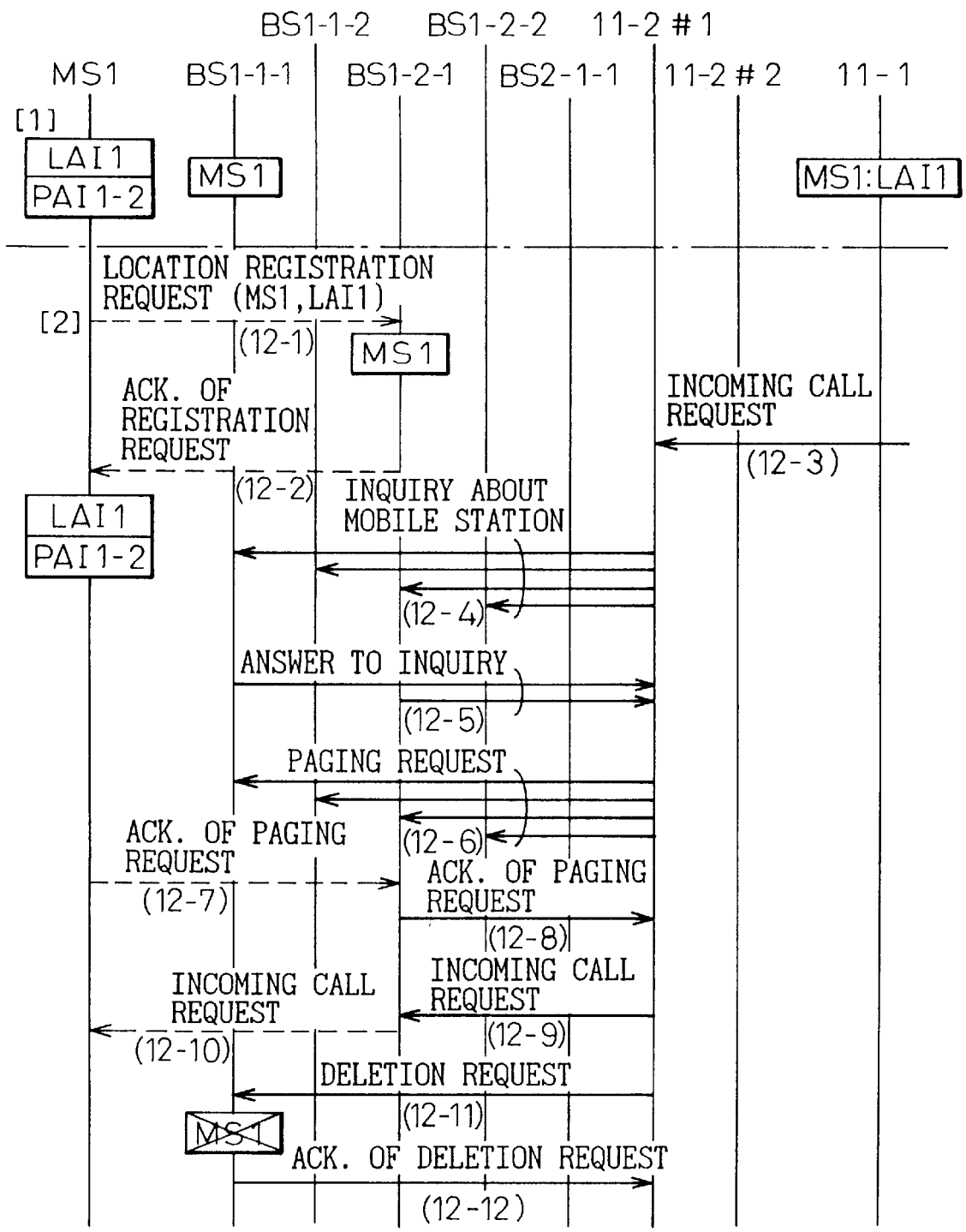
FIGS. 12 to 14 show sequences of registering and deleting the location of a mobile station and handling an incoming call to the mobile station in the system of FIG. 11.

In [1] of FIG. 12, the mobile station MS1 is at the location (1) in the paging area PAI1-1 in the location area LAI1. At this time, a memory 3-1 (FIG. 3) of the mobile station MS1 stores the identifiers LAI1 and PAI1-1. A storage unit 2-1 (FIG. 2) of the base station BS1-1-1 stores the identifier MS1, and the center 11-1 registers the identifier LAI1 for the mobile station MS1.

In [2] of FIG. 12, the mobile station MS1 moves from the location (1) to the location (2) that is in the paging area PAI1-2. At this time, the mobile station MS1 receives a radio signal containing the identifiers LAI1 and PAI1-2 periodically from the base station BS1-2-1 belonging to the paging area PAI1-2.

The mobile station MS1 compares the information stored in the memory 3-1 with the received information and recognizes that there is no change in the location area but a change in the paging area. As a result, the mobile station MS1 transmits a location registration request with its own identifier MS1 and the stored location area identifier LAI1 to the base station BS1-21, as indicated with (12-2) in FIG. 12.

In response to the request, the base station BS1-2-1 stores the identifier MS1 into the storage unit 2-1. The base station BS1-2-1 compares the location area identifier LAI1 contained in the location registration request with the location area identifier LAI1 of the location area to which the base station BS1-2-1 belongs and recognizes that there is no need to transmit a location registration request to the center 11-1. The base station BS1-2-1 returns an acknowledgment to the mobile station MS1 and terminates the process as indicated with (12-2) in FIG. 12.

If there is an incoming call to the mobile station MS1 as indicated with (12-3), the exchange station 11-2#1 transmits an inquiry about the mobile station MS1 to all base stations in the location area LAI1 registered for the mobile station MS1 in the center 11-1, as indicated with (12-4). In response to the inquiry, the base stations BS1-1-1 and BS1-2-1 return answers to the exchange station 11-2#1 as indicated with (12-5) because the mobile station identifier MS1 is registered in these base stations.

If the base station BS1-1-1 has deleted the mobile station identifier MS1 according to the timer process mentioned above, only the base station BS1-2-1 returns an answer.

From the answers, the exchange station 11-2#1 recognizes that the mobile station MS1 is in one of the paging areas PAI1-1 and PAI1-2. As a result, the exchange station 11-2#1 transmits a paging request to all base stations BS1-1-1, BS1-1-2, BS1-2-1, and BS1-2-2 belonging to the paging areas PAI1-1 and PAI1-2 as indicated with (12-6).

The base stations that have received the paging request page in the respective radio zones. In response to the paging, the mobile station MS1 returns an answer. At this time, the mobile station MS1 is in the radio zone of the base station BS1-2-1, and therefore, the base station BS1-2-1 receives the answer from the mobile station MS1 as indicated with (12-7).

This answer is transferred to the exchange station 11-2#1 as indicated with (12-8). The exchange station 11-2#1 transmits a usual incoming call request to the base station BS1-2-1 as indicated with (12-9). In response to the incoming call request, the base station BS1-2-1 sends an incoming call request to the mobile station MS1 as indicated with (12-10).

The exchange station 11-2#1 transmits a deletion request to delete the mobile station identifier MS1 to the base station BS1-1-1 as indicated with (12-11) because the base station BS1-1-1 returned no answer to the paging request although it returned an answer to the inquiry about the mobile station MS1.

In response to the deletion request, the base station BS1-1-1 deletes the mobile station identifier MS1 from the storage unit 2-1 thereof and returns an acknowledgment to the exchange station 11-2#1 as indicated with (12-12). It is not necessary to transmit such a deletion request whenever an incoming call occurs. For example, deletion requests for a plurality of mobile station identifiers may collectively be transmitted when network traffic is light.

Figure 13:
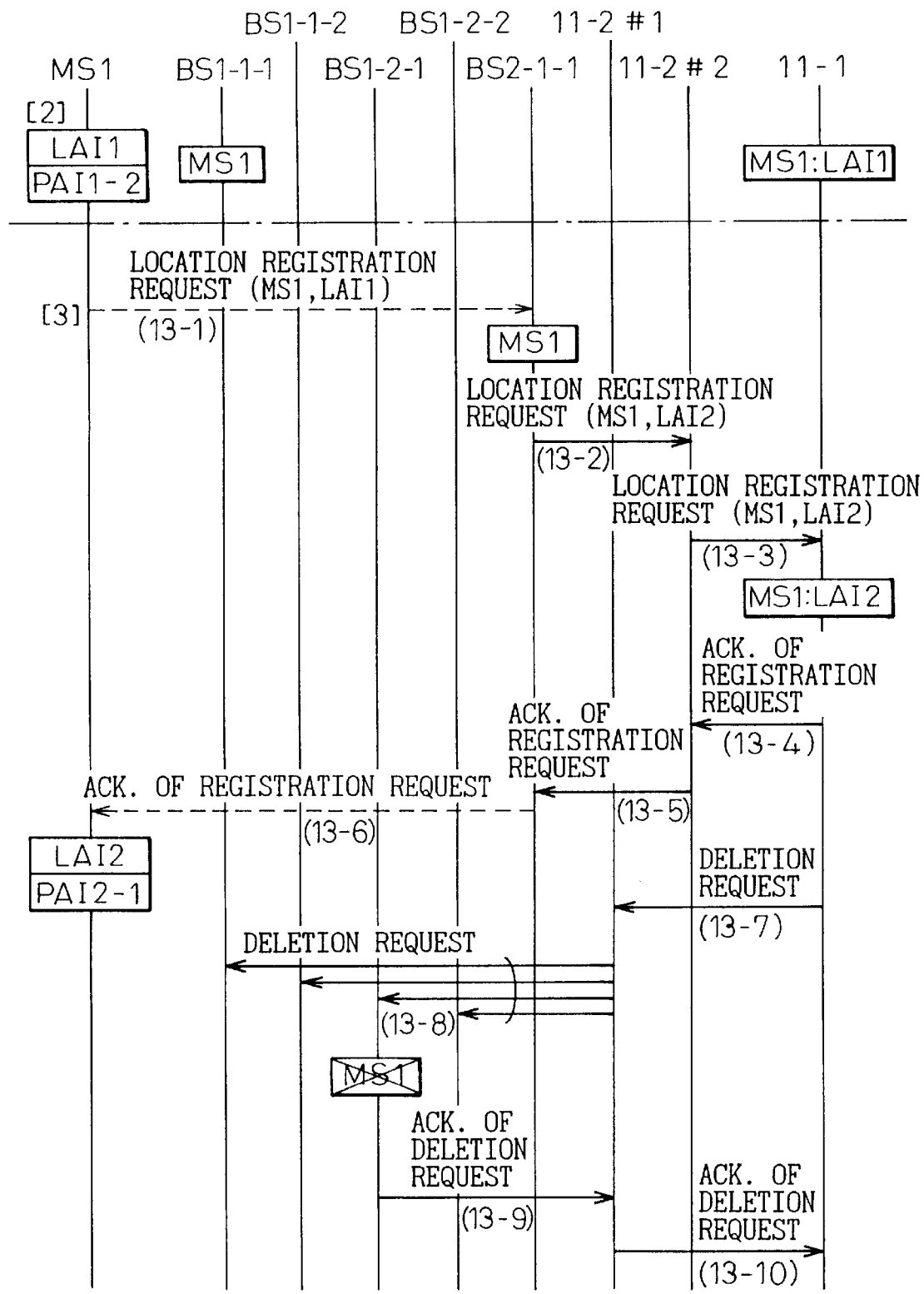

In FIG. 13, the mobile station MS1 moves from the location (2) to the location (3). In [2] of FIG. 13, the mobile station MS1 is at the location (2) in the paging area PAI1-2 in the location area LAI1. At this time, the memory 3-1 of the mobile station MS1 stores the location area identifier LAI1 and paging area identifier PAI1-2. The storage unit 2-1 of the base station BS1-2-1 stores the mobile station identifier MS1, and the center 11-1 registers the location area identifier LAI1 for the mobile station MS1.

In [3] of FIG. 13, the mobile station MS1 moves to the location (3). At this time, the mobile station MS1 receives a radio signal periodically from the base station BS2-1-1. This signal contains the location area identifier LAI2 and paging area identifier PAI2-1.

The mobile station MS1 compares the received information with information stored in the memory 3-1 and finds a change in the location area identifier. The mobile station MS1 transmits a location registration request to the base station BS2-1-1 as indicated with (13-1). The base station BS2-1-1 registers the mobile station identifier MS1 in the storage unit 2-1 (FIG. 2) thereof.

The base station BS2-1-1 refers to the location area identifier LAI1 contained in the location registration request and finds that it differs from the location area identifier LAI2 to which the base station BS2-1-1 belongs. The base station BS2-1-1 transmits a location registration request to the exchange station 11-2#2 as indicated with (13-2). The exchange station 11-2#2 transfers the location registration request to the center 11-1 as indicated with (13-3).

The center 11-1 updates the registered location area identifier for the mobile station MS1 to LAI2 and transmits an acknowledgment to the exchange station 112#2 as indicated with (13-4). The exchange station 112#2 transmits an acknowledgment to the base station BS2-1-1 as indicated with (13-5). The base station BS2-1-1 transmits an acknowledgment to the mobile station MS1 as indicated with (13-6). The mobile station MS1 stores the location area identifier LAI2 and paging area PAI2-1 into the memory 3-1.

The center 11-1 transmits a deletion request as indicated with (13-7) to the exchange station 11-2#1 that controls the location area LAI1 so that the base station that was controlling the mobile station MS1 so far in the location area LAI1 may delete the mobile station identifier MS1.

The exchange station 11-2#1 transfers the deletion request to the base stations in the location area LAI1 as indicated with (13-8). The base station BS1-2-1 deletes the mobile station identifier MS1 from the memory 2-1 thereof and returns an acknowledgment to the exchange 112#1 as indicated with (13-9). The exchange station 112#1 returns an acknowledgment to the center 11-1 as indicated with (13-10). It is not necessary to transmit such a deletion request whenever a location registration request occurs. For example, deletion requests for a plurality of mobile station identifiers may collectively be transmitted when network traffic is light.

Figure 14:
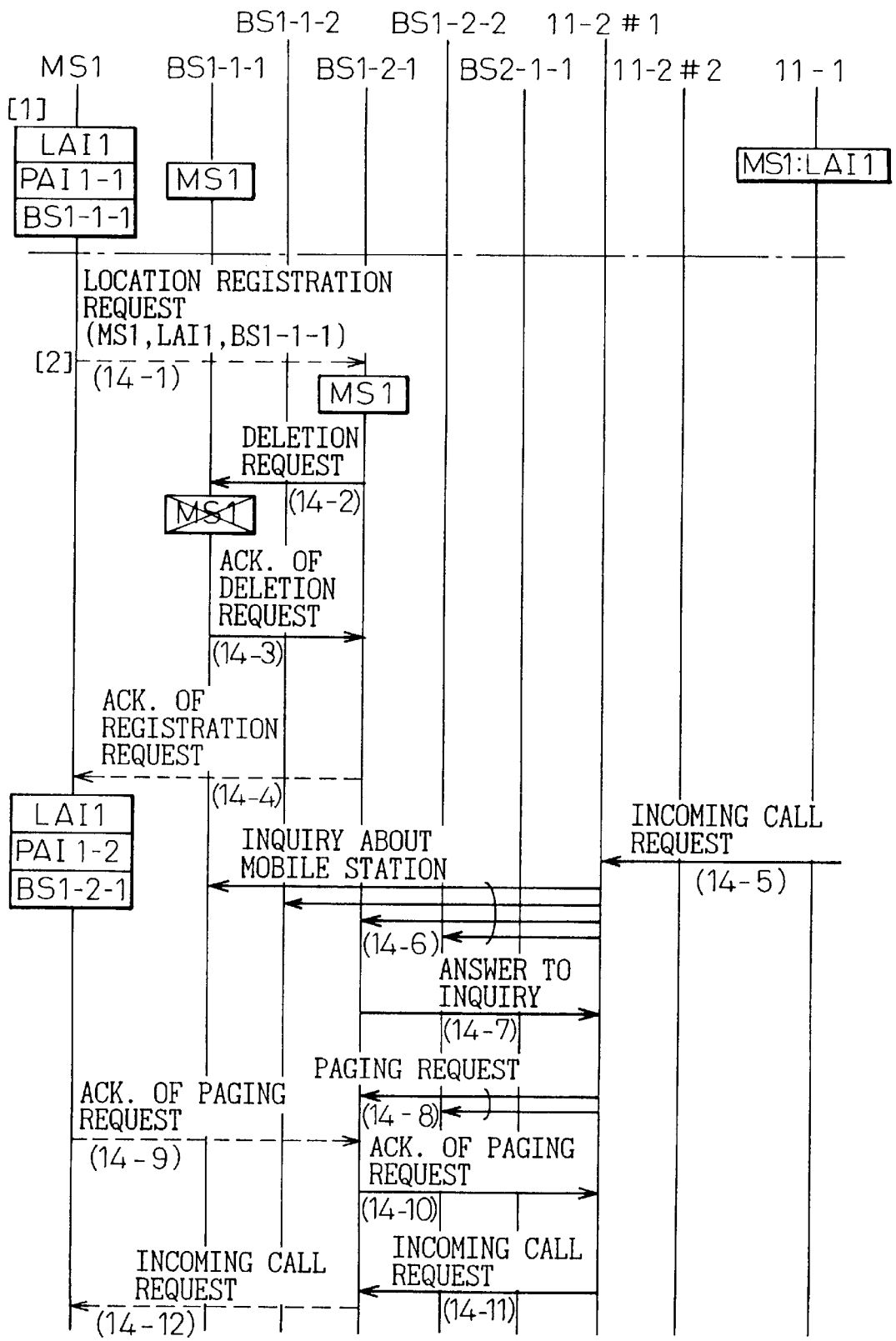
Figure 15:
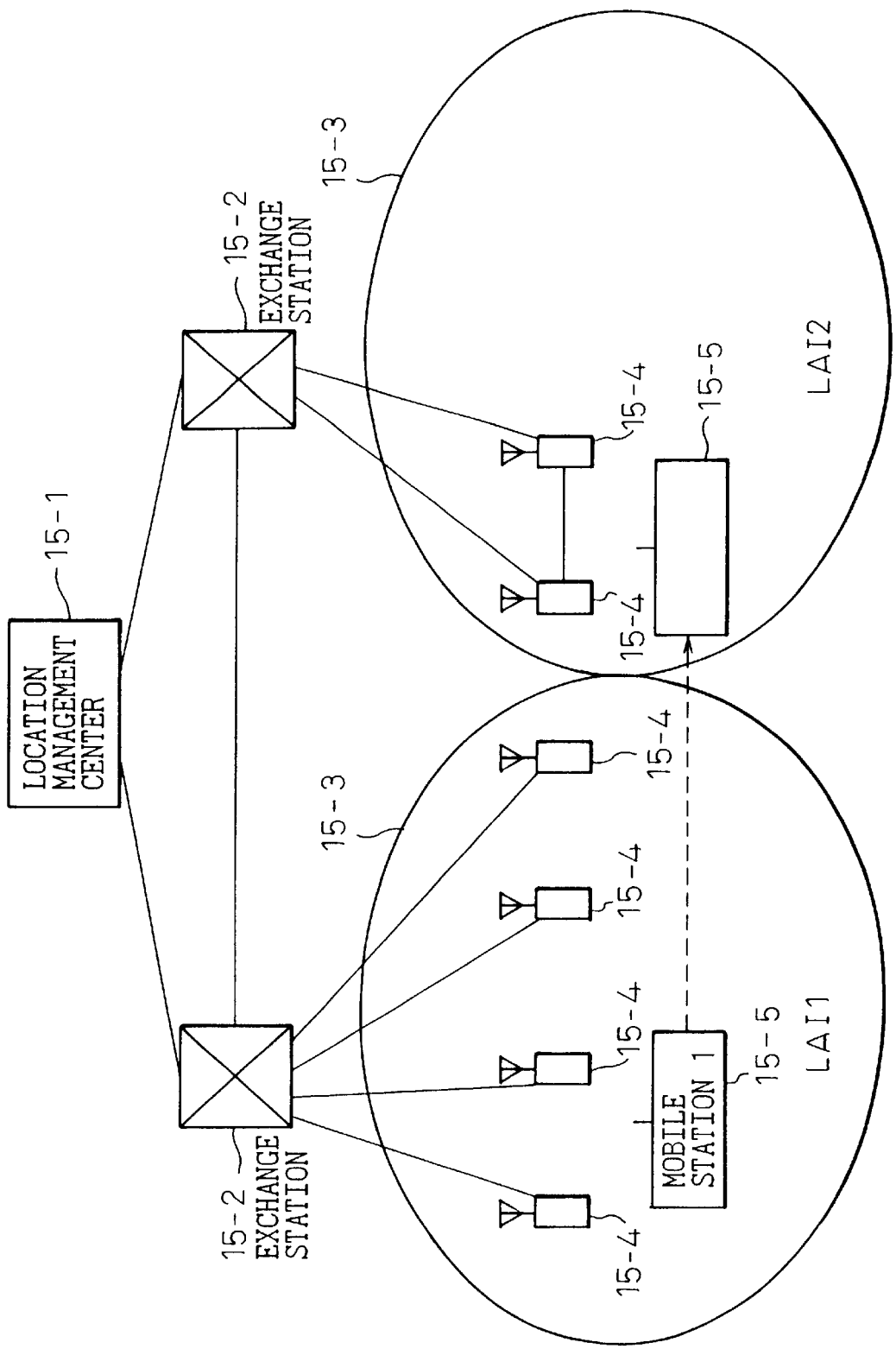
FIG. 15 shows a mobile communication system according to the prior art.

FIG. 14 shows a sequence of transmitting and receiving signals to delete a mobile station identifier from a base station according to a deletion request from another base station.

In [1] of FIG. 14, the mobile station MS1 is at the location (1) in the paging area PAI1-1 in the location area LAI1. At this time, the memory 3-1 of the mobile station MS1 stores the location area identifier LAI1, paging area identifier PAI1-1, as well as the base station identifier BS1-1-1 that is controlling the mobile station MS1.

The storage unit 2-1 of the base station BS1-1-1 stores the mobile station identifier MS1. The center 111 registers the location area identifier LAI1 for the mobile station MS1.

In [2] of FIG. 14, the mobile station MS1 moves from the location (1) to the location (2) in the paging area PAI1-2. The mobile station MS1 receives a radio signal periodically from the base station BS1-2-1. The radio signal contains the location area identifier LAI1 and paging area identifier PAI1-2.

The mobile station MS1 compares the received information with the information stored in the memory 3-1 and detects a change in the paging area. As a result, the mobile station MS1 transmits a location registration request to the base station BS1-2-1. The location registration request contains the mobile station identifier MS1, location area identifier LAI1 stored in the memory 3-1, and base station identifier BS1-1-1 stored in the memory 3-1, as indicated with (14-1).

The base station BS1-2-1 stores the mobile station identifier MS1 and recognizes that there is no need of transmitting a location registration request to the center 11-1 because there is no difference between the location area identifier LAI1 contained in the location registration request and the location area identifier LAI1 to which the base station BS1-2-1 belongs. The base station BS1-2-1 transmits a deletion request for deleting the mobile station identifier MS1 to the base station BS1-1-1 as indicated with (14-2).

The base station BS1-1-1 deletes the mobile station identifier MS1 from the storage unit 2-1 thereof and returns an acknowledgment to the base station BS1-2-1 as indicated with (14-3). The base station BS1-2-1 returns an acknowledgment to the mobile station MS1 as indicated with (14-4). The mobile station MS1 stores the location area identifier LAI1, paging area identifier PAI1-2 and base station identifier BS1-2-1 in the memory 3-1.

Steps that follow are the same as those of FIGS. 12 and 13. Namely, the exchange station 11-2#1 receives an incoming call as indicated with (14-5) and transmits an inquiry about the mobile station MS1 to all base stations belonging to the location area LAI1 that is registered in the center 11-1 for the mobile station MS1, as indicated with (14-6).

In response to the inquiry, the base station BS1-2-1 in which the mobile station MS1 is registered returns an answer as indicated with (14-7). The exchange station 11-2#1 receives the answer and recognizes that the mobile station MS1 is in the paging area PAI1-2. The exchange station 11-2#1 transmits a paging request to the base stations BS1-2-1 and BS1-2-2 belonging to the paging area PAI1-2 as indicated with (14-8).

The base stations BS1-2-1 and BS1-2-2 page in the respective radio zones. In response to the paging the mobile station MS1 returns an acknowledgment, which is received by the base station BS1-2-1 as indicated with (14-9) because the mobile station MS1 is in the radio zone controlled by the base station BS1-2-1.

The base station BS1-2-1 sends an acknowledgment to the exchange station 11-2#1 as indicated with (14-10), and the exchange station 11-2#1 transmits a usual incoming call request to the base station BS1-2-1 as indicated with (14-11). The base station BS1-2-1 transfers the incoming call request to the mobile station MS1 as indicated with (14-12).

When a location registration request newly occurs in connection with a mobile station, this embodiment transmits a deletion request to delete a mobile station identifier representing the mobile station in question at a base station from which the mobile station moved out and which still holds the mobile station identifier. As a result, a mobile station identifier is registered only in one base station. Namely, the exchange station may transmit a paging request only to a single paging area, to thereby improve the efficiency of use of radio resources.

Although the embodiment issues a mobile station identifier deleting request whenever a location registration request occurs, it is possible to accumulate and collectively issue such deletion requests.

Although the present invention allocates a location area to an exchange station, a plurality of location areas may be allocated to an exchange station, or a plurality of exchange stations may control a location area. Although the present invention arranges a plurality of base stations in a paging area, a base station may be arranged in a paging area.

A location registration request transmitted from a mobile station according to the present invention contains a location area identifier, a paging area identifier, and a base station identifier. Each base station is capable of recognizing a location area to which the base station belongs. Accordingly, each base station may add the location area identifier related thereto to a location registration request sent from a mobile station when transferring the location registration request to a location management center through an exchange station. In this case, each mobile station may transmit a location registration request with information indicating whether or not the mobile station has changed the location area thereof and may exclude a location area identifier and paging area identifier from the location registration request.

In FIGS. 6 and 14, a mobile station must include a base station identifier in a location registration request so that a base station that receives the location registration request may immediately send a mobile station identifier deleting request to a base station that was controlling the mobile station till then. The base station identifier may be excluded from the location registration request if the mobile station identifier is deleted according to the timer process or incoming call process mentioned above.

Although the present invention controls a paging area with base stations, it is possible to control paging areas with an exchange station. In this case, the storage unit provided for each base station is installed in the exchange station. If there is an incoming call to a mobile station, the exchange station searches the storage unit for a paging area where the mobile station is present. Thereafter, the exchange station transmits a paging request to all base stations belonging to the paging area.

In this case, the deletion of a mobile station identifier from the storage unit is achieved when the mobile station moves to a location or paging area that is controlled by another exchange station.

Moreover, in response to an incoming call to a mobile station, the exchange station is not required to send an inquiry about the mobile station to all base stations in the location area thereof. This speeds up the processing of the incoming call. This, however, concentrates location registration requests on the exchange station and increases load on the exchange station. In addition, the searching of the storage unit in the exchange station for a mobile station with respect to every incoming call increases the load on the exchange station.

The present invention installs the device for managing the paging areas in the base stations or the exchange stations. In any case, the present invention manages the locations of mobile stations in two layers of the location areas and paging areas. The location managing center (1-1, 11-1) manages the locations of mobile stations only in the location areas, and the base stations or exchange stations manage the locations of mobile stations in the paging areas.

As explained above, the present invention divides each location area of a mobile communication system into paging areas and uses them as units to page mobile stations. With the use of the narrow paging areas, the present invention improves the efficiency of use of radio resources of the mobile communication system. Location registration requests to the location management center of the system occur only when the mobile stations move from a location area to another. If the mobile stations move from a paging area to another in the same location area, information about the mobile stations in the base stations or exchange stations may be updated but no location registration requests are issued to the location management center. Namely, the number of location registration requests to be made to the location management center according to the present invention is in the same level as that of the prior art. The present invention never increases the load on the location management center.

What is claimed is:

1. A mobile communication system, comprising:
   a base station having:
      storage means installed in the base station, for registering mobile stations in connection with paging areas, the size of which is restricted by dividing the areas covered by at least one base station into a plurality of reduced paging areas, within at least one of which a call to all mobile stations therein is made;
      means for receiving a location registration request from a mobile station and for registering the mobile station in the storage means in the base station in connection with a corresponding one of the reduced paging areas; and
      means for determining, according to the location registration request, whether or not a location area or a paging area registered for the mobile station must be updated, if the paging area must be updated, for processing a location registration request within a base station, and if the location area must be updated, for transmitting a location registration request to a location management center through an exchange station; and
   the mobile station includes:
      means for comparing (a) a location area identifier and a reduced paging area identifier stored in said mobile station with (b) location area identifier and a reduced paging area identifier transmitted from one of the base stations, and if a difference is detected in at least one of said identifiers, for transmitting to the base station said location registration request containing a mobile station identifier of its own.

2. A mobile communication system, comprising:
   an exchange station having storage means installed in the exchange station, for registering mobile stations in connection with paging areas where the mobile stations are present, means for receiving an incoming call to a mobile station, means for referring to a location management center to find location area registered for the mobile station, means for transmitting an inquiry about the mobile station to the storage means according to the found location area, means for receiving an answer to the inquiry, and identifying one of the paging areas where the mobile station is present according to the answer, and means for transmitting a paging request to base stations that belong to the identified paging area, wherein the paging area are formed in each of the location areas.

3. The system of claim 1, wherein the base station has:
   a radio channel controller for controlling radio channels to the mobile stations;
   a wire channel controller for controlling wire channels in cooperation with the exchange station; and
   storage means for storing a mobile station identifier contained in a location registration request received from one of the mobile stations.

4. The system of claim 1, wherein the base station has:
   means for transmitting a radio signal to the mobile stations, the radio signal containing a location area identifier representing one of the location areas to which the base station belongs, a paging area identifier representing one of the paging areas to which the base station belongs, and a base station identifier representing the base station.

5. The system of claim 4, wherein the mobile station has:
   a radio controller for controlling radio channels in cooperation with the base station; and
   a memory for storing a location area identifier, a paging area identifier, and a base station identifier transmitted from one of the base stations.

6. The system of claim 1, wherein:
   the location registration request further contains the location area identifier and paging area identifier stored in the memory of the mobile station; and
   the base station has means for determining determines whether or not the location area identifier contained in the location registration request is equal to that of a location area to which the base station belongs, and if they are not equal to each other, transmitting said location registration request to the location management center through the exchange station.

7. The system of claim 5, wherein:

a location registration request to be transmitted from any one of the mobile stations contains a base station identifier stored in the memory of the mobile station; and the base stations have each means for receiving a location registration request from one of the mobile stations and transmitting a deletion request to a base station whose identifier is contained in the location registration request so that the latter base station may delete therefrom a mobile station identifier representing the mobile station that has issued the location registration request.

8. The system of claim 2, wherein the exchange station has:

means for receiving an incoming call to one of the mobile stations, sending an inquiry about the mobile station to the storage means, receiving an answer to the inquiry, and if the answer indicates a plurality of the paging areas, transmitting a paging request to the base stations that belong to the plurality of the paging areas and transmitting a deletion request to delete a mobile station identifier representing the mobile station in question to the storage means that manages the paging areas that have returned no acknowledgment to the paging request.

9. The system of claim 1, wherein the storage means further has:

means for deleting a mobile station identifier if a mobile station represented with the mobile station identifier causes no outgoing call, incoming call, or location registration request within a predetermined period.

10. The system of claim 2, wherein the storage means further has:

means for deleting a mobile station identifier if a mobile station represented with the mobile station identifier causes no outgoing call, incoming call, or location registration request within a predetermined period.

11. The system of claim 1, wherein the location management center has:

means for receiving a location registration request originated from a mobile station that has just moved from one of the location areas to another and for transmitting a deletion request to delete a mobile station identifier, representing the mobile station in question, to the storage means related to the paging areas that are in the location area from which the mobile station in question has just moved out.

12. The system of claim 2, wherein the location management center has:

means for receiving a location registration request originated from a mobile station that has just moved from one of the location areas to another and for transmitting a deletion request to delete a mobile station identifier, representing the mobile station in question, to the storage means related to the paging areas that are in the location area from which the mobile station in question has just moved out.

* * * * *